United States Patent Office 3,479,417
Patented Nov. 18, 1969

1

3,479,417
GRAFT COPOLYMERS OF α-OLEFINS AND PREFORMED, WATER-INSOLUBLE, HOMOPOLYMER OF N-VINYL-2-PYRROLIDONE
Marvin R. Leibowitz, Edison, and Frederick Grosser, Midland Park, N.J., assignors to G A F Corporation, New York, N.Y., a corporation of Delaware
No Drawing. Filed Nov. 16, 1966, Ser. No. 594,654
Int. Cl. C08f *19/00, 33/08*
U.S. Cl. 260—878         8 Claims

ABSTRACT OF THE DISCLOSURE

Process of preparing novel polymeric materials by polymerizing α-olefins in the presence of water-insoluble homopolymers of n-vinyl-2-pyrrolidone using a Ziegler catalyst.

---

This invention relates to a new and useful class of graft copolymers of an α-olefin of from 2 to 42 carbon atoms and preformed, water-insoluble, homopolymer of N-vinyl-2-pyrrolidone, and to the process of preparing the same.

Polyalkylene plastics, especially polyethylene, polypropylene and polybutene, are well-established commercial products having a variety of industrial applications. Films, fibers, shaped articles, etc., prepared from such polyalkylene plastics are not readily susceptible to dyeing prior to such fabrication. In other words, their inherent disadvantage is their extremely poor dyeability.

We have found a new class of graft copolymers of α-olefins of from 2 to 42 carbon atoms and preformed, water-insoluble, homopolymers of N-vinyl-2-pyrrolidone, which are readily susceptible to dyeing and readily molded into colored films, fibers and various shaped articles.

In providing the new class of graft copolymers, we employ as the starting material an insoluble preformed homopolymer of N-vinyl-2-pyrrolidone obtained by the process described in United States Patent 2,938,017, of May 24, 1960, which involves heating monomeric N-vinyl-2-pyrrolidone in the presence of about 1% to 5% by weight of the monomer of an alkaline catalyst at a temperature of from about 40° C. to 200° C. until the monomer is homopolymerized to a white, insoluble solid. The alkaline catalyst is preferably an alkali metal, alkaline earth metal, or the oxides, hydroxides and alkoxides of these metals. After the homopolymerization is completed, the reaction mixture is cooled and the homopolymer slurried with water to wash out the alkaline catalyst and any small amount of unconverted monomer that may be present, filtered, dried and ground to powdery consistency. The resulting homopolymer is insoluble in water, strong mineral acids, caustic solutions, aliphatic and aromatic hydrocarbons and in common organic solvents such as methanol, ethanol, acetone, chloroform, butyrolactone, tetrahydrofurane, ethylacetate, heptane, benzene, xylene, pyridine, diethyl ether, petroleum ether, carbon tetrachloride, dichloroethane, methylethyl ketone, kersosene, dibutyl phthalate, triethylene glycol, trichloroethylene, triethanolamine, pyrrolidone, propargyl alcohol, nonylphenol, vinyl isobutyl ether, dioxane, dimethyl chloroacetal, α-(chloromethoxy)-ethylbenzene and other solvents. The unusual characteristic of the resulting insoluble homopolymer is that it can be heated to 300° C. without any evidence of decomposition.

The second material which is reacted with the insoluble homopolymer, prepared as above, is any α-olefinic hydrocarbon of from 2 to 42 carbon atoms, such as ethylene, propylene, 1-butene, 2-ethyl-1-butene; 2-methyl-1-pentene; 1-hexene; 5-methyl-1-hexene; 2-methyl-1-pentene; 1-hexene; 5-methyl-1-hexene; 2-methyl-1-pentene; 3-ethyl-1-pentene, 1-heptene; 1-octene; 1-nonene; 2-ethyl-1-hexene; 1-decene; 1-dodecene; 1-tetradecene; 1-hexadcene; 1-heptadecene; 1-octadecene; 1-nonadecene; 1-eicosene; 1-docosene; 1-tetra-cosene; 1-pentacosene and trimerized α-tetradecene.

In preparing the new class of graft copolymers of the present invention, while employing the foregoing materials, from 0.5% to 50% by weight of the insoluble preformed homopolymer in powder form is slurried in any liquid aliphatic or aromatic hydrocarbon such as, for example, heptane, hexane, octane, decane, benzene, toluene, xylene and the like. The amount of the latter is not critical and any amount may be employed which yields a workable slurry. To the resulting slurry there is added a Ziegler type catalyst, especially of the metal alkyl/metal chloride complex, of which there are many variations and which are well know to those skilled in the art. A preferred Ziegler type catalyst is titanium tetrachloride with an organo aluminum compound, such as aluminum triethyl, aluminum triisopropyl, aluminum triisobutyl, aluminum tri-n-hexyl and the like, which is prepared by mixing 1 part by volume of titanium tetrachloride with 5-20 parts by volume of the organo aluminum compound. The concentration of the organo aluminum/titanium tetrachloride catalyst is not critical. Normally 1 part by weight of the catalyst is employed per 0.1 to 1 part by weight of the insoluble homopolymer.

To the slurry containing the insoluble homopolymer and catalyst, there is added from 50% to 99.5% by weight of an α-olefin of from 2 to 42 carbon atoms, at either atmospheric pressure or pressure of from 300–1,000 p.s.i.g. in the presence or absence of inert gas such as nitrogen and a temperature ranging from ambient to about 180° C. for a period of time ranging from 1 to 12 hours. With α-olefins of from 2 to 4 carbon atoms a shorter period of time is required ranging from 1 to about 4 hours. Further, in connection with such lower α-olefins, it is to be noted that the amount employed need not be weighed, since the actual amount that is consumed is dependent on the amount of the insoluble homopolymer used in the reaction. The percent by weight of the insoluble homopolymer in the resulting graft copolymer is determined by nitrogen analysis and the difference between such percentages and 100% is the percent by weight of the graft copolymerized α-olefin.

The following examples will serve to illustrate the principles involved in our invention, but are not intended to limit the scope unless otherwise specifically indicated.

EXAMPLE I

A 500 ml. flask provided with stirrer and a single inlet was charged under nitrogen atmosphere with 200 ml. of benzene, 1 gram of insoluble polyvinylpyrrolidone, 0.4 ml. of titanium tetrachloride and 3.75 ml. of aluminum triisobutyl. The charge was stirred and ethylene slowly admitted through the inlet over a 1½ hour period. A white precipitate was formed. Extra benzene was added to the flask and the slurry filtered, washed with aqueous alcoholic HCl and dried at 80° C. for several hours. A graft copolymer weighing 22 grams was obtained containing 3.2% by weight of vinyl pyrrolidone as determined by nitrogen analysis.

EXAMPLE II

To a 2-liter flask equipped with stirrer, thermometer and a single inlet, there was charged 1,000 ml. of heptane, 10 grams of insoluble polyvinylpyrrolidone, 4.4 ml. of titanium tetrachloride and 37.5 ml. of aluminum triisobutyl. The charge was stirred and heated to 50° C., and propylene added through the single inlet over a period of 3 hours. After 3 hours, the addition of propylene was discontinued and the viscous slurry precipitated with acetone, filtered, washed with aqueous alcoholic HCl and dried at 80° C. for several hours. A yield of 124 grams of graft copolymer was obtained containing 7% vinyl pyrrolidone as determined by nitrogen analysis.

EXAMPLE III

Example II was repeated with the exception that the propylene was replaced by 1-butene. A yield of 100 grams of graft copolymer was obtained containing 10 percent vinyl pyrrolidone as determined by nitrogen analysis.

EXAMPLE IV

Into a 1-liter, 4-necked flask, equipped with stirrer, thermometer, nitrogen inlet and reflux condenser, there were charged 500 ml. of n-octane, 5 grams of insoluble polyvinylpyrrolidone, 2.2 ml. of titanium tetrachloride and 18.8 ml. of aluminum triisobutyl, followed by the addition of 50 grams of α-eicosene. The flask was then purged with nitrogen and heated. When the temperature reached around 120° C., the reaction was initiated and controlled by maintaining the temperature at 120–135° C. After 8 hours, the reaction mixture was allowed to cool to room temperature, the viscous slurry precipitated with acetone, filtered, washed with aqueous alcoholic HCl and dried at 80° C. for several hours. A yield of 40 grams of graft copolymer was obtained, containing 12.5 percent of vinylpyrrolidone as determined by nitrogen analysis.

EXAMPLE V

Into a 1-liter, 4-necked flask equipped with stirrer, thermometer, inlet and reflux condenser, there were charged 500 ml. of n-heptane, 5 grams of insoluble polyvinylpyrrolidone and 50 grams of a $C_{42}$ α-olefin obtained by the trimerization of α-tetradecene, 2.2 ml. of titanium tetrachloride and 18.8 ml. of aluminum triisobutyl. The flask was purged with nitrogen and heated at reflux for 10 hours and then cooled. The viscous slurry was precipitated out with acetone, filtered, washed with aqueous alcoholic HCl and dried at 80° C. for several hours. A yield of 35 grams of graft copolymer was obtained containing 15 percent of vinylpyrrolidone as determined by nitrogen analysis.

EXAMPLE VI

Into a 1-liter stainless steel shaker bomb, a prepared slurry of 5 grams of insoluble polyvinylpyrrolidone, 500 ml. of n-heptane and 1.0 gram of di-t-butyl peroxide was charged and the bomb capped and 95 grams of ethylene injected and the bomb sealed. The bomb was heated and maintained at 125° C. with shaking for 12 hours. It was then cooled, vented and the viscous slurry discharged into a 1-liter beaker and the slurry precipitated with acetone, filtered, washed with aqueous alcoholic HCl and dried at 80° C. for several hours. A yield of 100 grams of graft copolymer was obtained containing 5 percent vinyl pyrrolidone as determined by nitrogen analysis.

While the present invention has shown the graft copolymerization with individual α-olefins of from 2 to 42 carbon atoms, a mixture of olefins may also be employed, as well as individual mono halo-α-olefins and polyhalo-α-olefins of from 2 to 6 carbon atoms, such as, for example, vinylidene fluoride, vinylidene chlorofluoride, allyl chloride, 4-chloro-1-butene $$(CH_2{=}CH{-}CH_2{-}CH_2Cl)$$

3,3,4,4,4-pentafluoro-1 - butene $(CH_2{=}CH{-}CF_2{-}CF_3)$, 5-chloro-1 - pentene $(CH_2{=}CH{-}CH_2{-}CH_2{-}CH_2Cl)$; 3,3,4,4,5,5,5-heptafluoro-1-pentene $$(CH_2{=}CH{-}CF_2CF_2CF_3)$$

3,3,4,4,5,5,6,6,6-nonafluoro-1-hexene $$(CH_2{=}CH{-}CF_2{-}CF_2{-}CF_2{-}CF_3)$$

etc., to yield a series of a new and useful class of graft copolymers having fire resistant properties.

While a preferred Ziegler type catalyst has been employed in the illustrative working examples, it is to be understood that organometallic compounds of the metals Group III–A of the Periodic Table, i.e., organometallic compounds of aluminum, gallium and indium may be employed, as well as a mixture of one of such organometallic compounds with a compound, preferably halide, of a metal of Groups IV–B, V–B, VI–B and VIII of the Periodic Table.

The graft copolymerization may also be effected by heating the reactants in any suitable reaction vessel at temperatures of from ambient to 180° C. and under reflux at temperatures above 80° C. Organic peroxides instead of the Ziegler type catalyst may also be employed to effect the graft copolymerization, such as, for example, di-t-butyl peroxide, t-butyl hydroperoxide, paramenthan hydroperoxide and the like, in an amount of 1 part by weight per 3 to 6 parts by weight of insoluble homopolymer.

The graft copolymers of the present invention may be heated to about 150° C. to obtain a melt, to which may be added any acid type dye in sufficient quantity to impart the desired color. Dyes of this type would include those that are normally employed for dyeing nylon, Dacron, polyethylene, etc. The dyed melt is then fabricated in the conventional manner into fibers, films and shaped articles.

The graft copolymers prepared in accordance with the present invention, while insoluble in water and in the aforementioned solvents, are soluble in dimethylformamide and the solution with or without acid type dye spun by conventional means into fibers of high softening point. The graft copolymers which are preferred for fiber manufacture are those which contain at least 50% by weight of combined α-olefin of from 2 to 4 carbon atoms. Such copolymers have the desirable characteristics of polyethylene, polypropylene and polybutylene and also the desired dyeability properties imparted by the polyvinylpyrrolidone moieties.

We claim:
1. Process for the preparation of novel polymaic material which comprises polymerizing a slurry of a preformed, water and organic solvent insoluble, homopolymer of polyvinylpyrrolidone in an inert organic liquid medium with an α-olefinic hydrocarbon of from 2 to 42 carbon atoms in the presence of a catalyst selected from the class consisting of Ziegler catalysts at a temperature ranging from ambient to 180° C. and a pressure ranging from atmospheric to 1,000 p.s.i.g. said α-olefinic hydrocarbon comprising 50% to about 95% by weight of said novel polymeric material.

2. Process according to claim 1 wherein the α-olefinic hydrocarbon is ethylene.

3. Process according to claim 1 wherein the α-olefinic hydrocarbon is propylene.

4. Process according to claim 1 wherein the α-olefinic hydrocarbon is 1-butene.

5. A novel polymeric material prepared by the process of claim 7.

6. A novel polymeric material prepared by the process of claim 1 wherein the α-olefinic hydrocarbon is ethylene.

7. A novel polymeric material prepared by the process of claim 1 wherein the α-olefinic hydrocarbon is propylene.

8. A novel polymeric material prepared by the process of claim 1 wherein the α-olefinic hydrocarbon is 1-butene.

References Cited

UNITED STATES PATENTS

| 2,938,017 | 5/1960 | Grosser | 260—88.3 |
| 3,316,328 | 4/1967 | Press | 260—897 |
| 3,332,938 | 7/1967 | Mayhew et al. | 260—88.3 |
| 3,406,238 | 10/1968 | Freyermuth et al. | 260—88.3 |

MURRAY TILLMAN, Primary Examiner

JOHN T. GOOLKASIAN, Assistant Examiner

U.S. Cl. X.R.

260—88.3, 895